(12) United States Patent  
Izumi

(10) Patent No.: US 7,271,932 B2  
(45) Date of Patent: Sep. 18, 2007

(54) DIGITAL IMAGE PROCESSING APPARATUS, DIGITAL IMAGE PROCESSING METHOD, DIGITAL IMAGE PROCESSING PROGRAM PRODUCT, AND DIGITAL IMAGE PRINTING SYSTEM

(75) Inventor: Keisuke Izumi, Osaka (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 737 days.

(21) Appl. No.: 10/291,405

(22) Filed: Nov. 12, 2002

(65) Prior Publication Data

US 2003/0095785 A1     May 22, 2003

(30) Foreign Application Priority Data

Nov. 16, 2001     (JP) .............................. 2001-351701

(51) Int. Cl.
G06K 15/00 (2006.01)
G06K 9/20 (2006.01)
G06K 9/36 (2006.01)
H04N 7/14 (2006.01)

(52) U.S. Cl. ...................... 358/1.9; 358/1.18; 382/254; 382/282; 348/14.14

(58) Field of Classification Search ............... 358/1.17, 358/1.18, 3.23, 1.6, 1.9, 1.13, 1.16; 345/473, 345/475; 382/305, 254, 282
See application file for complete search history.

(56) References Cited

U.S. PATENT DOCUMENTS

| | | | |
|---|---|---|---|
| 4,965,662 A * | 10/1990 | Shiota ........................ 358/540 |
| 5,649,046 A * | 7/1997 | Stewart et al. ................. 386/52 |
| 5,774,235 A | 6/1998 | Arakawa et al. |
| 5,982,364 A * | 11/1999 | Beckwith ..................... 715/723 |
| 5,999,173 A * | 12/1999 | Ubillos ........................ 715/724 |
| 6,674,538 B2 * | 1/2004 | Takahashi ................... 358/1.15 |
| 6,747,991 B1 * | 6/2004 | Hemy et al. ................. 370/468 |
| 6,870,573 B2 * | 3/2005 | Yeo et al. ................... 348/569 |
| 6,912,327 B1 * | 6/2005 | Hori et al. .................. 382/305 |

(Continued)

FOREIGN PATENT DOCUMENTS

JP     6-261272 A     9/1994

(Continued)

OTHER PUBLICATIONS

Kraynak, J. The Complete Idiot's Guide to Microsoft Office 2000. Que Publishing, Indianapolis, IN. 1999. pp. 156-157, 176.*

*Primary Examiner*—Jerome Grant, II
(74) *Attorney, Agent, or Firm*—Smith Patent Office

(57) ABSTRACT

Digital image processing apparatus is provided with a monitor for displaying an image, a moving picture reader for reading moving picture data, a memory for storing still image data obtained from the moving picture data, a display controller for displaying on the monitor a specified number of still image frames of the still image data, an image designator for allowing an operator to designate a still image frame for print among the specified number of still image frames, and an image outputter for outputting still image data corresponding to the designated still image frame as print data. The apparatus is further provided with an image converter for converting compressed moving picture data into still image data having a number of still image frames. Designation of a desired still image from moving picture data can be user-friendly performed.

4 Claims, 7 Drawing Sheets

U.S. PATENT DOCUMENTS

| | | | |
|---|---|---|---|
| 2002/0028026 A1* | 3/2002 | Chen et al. | 382/284 |
| 2002/0075269 A1* | 6/2002 | Dutta et al. | 345/473 |
| 2002/0135808 A1* | 9/2002 | Parry | 358/1.17 |
| 2002/0186405 A1* | 12/2002 | Gragg et al. | 358/1.15 |
| 2003/0107773 A1* | 6/2003 | Takamine et al. | 358/296 |

FOREIGN PATENT DOCUMENTS

| | | |
|---|---|---|
| JP | 8-163482 A | 6/1996 |
| JP | 11-120353 A | 4/1999 |
| JP | 2001-54607 A | 2/2001 |
| JP | 2001-78127 A | 3/2001 |

\* cited by examiner

DIGITAL IMAGE PROCESSING APPARATUS, DIGITAL IMAGE PROCESSING METHOD, DIGITAL IMAGE PROCESSING PROGRAM PRODUCT, AND DIGITAL IMAGE PRINTING SYSTEM

BACKGROUND OF THE INVENTION

1. Field of the Invention

This invention relates to a digital image processing apparatus for processing a still image or images obtained from moving picture data, a digital image processing method, a program product for processing digital image, and a digital image printing system provided with a digital image processing apparatus.

2. Description of the Related Art

Heretofore, digital cameras or digital still cameras have been widespread thanks to development of the technology of image pick-up devices such as Charge Coupled Devices (CCDs). As the development of image pick-up devices has been progressed, a variety of digital image printing apparatus for printing digital images photographed by digital cameras onto printing paper have been developed. Also, digital cameras capable of photographing moving pictures as well as still images have been developed. An operator, even if having a poor photographing technique, can timely photograph a moving picture of a desired motion with such a digital camera by setting the camera at a moving picture mode, thereby effectively photographing a timely scene or a necessary scene.

In the above conventional digital image printing system, a desired frame image of a moving picture photographed by a digital camera cannot be printed on printing paper as it is as a still image without performing a specified image processing due to a difference in file format between a moving picture and a still image. Specifically, moving picture data is processed according to a moving picture format such as Moving Picture Experts Group (MPEG), and is compressed in such a manner that a difference between raw data and reference data exists as image data in each moving picture frame. Accordingly, such a moving picture frame cannot be printed on printing paper as a still image frame without performing a specified image processing. In view of the above, demanded is production of user-friendly or handy digital image processing apparatus capable of converting a moving picture frame in the form of compressed image data into a desired still image frame to be printed on printing paper, and a digital image printing system provided such a digital image processing apparatus. Further, it should be preferable that such image processing apparatus is applicable for a moving picture comprised of a series of still image frames in which image data of all the frames of the moving picture are recorded without compression.

SUMMARY OF THE INVENTION

It is an object of the present invention to provide a technology which has overcome the problems residing in the prior art.

It is another object of the present invention to provide an apparatus, method, and program product for processing digital image, and a digital image printing system which can assure an easier designation of a desired still image from moving picture data.

According to an aspect of the invention, a digital image processing apparatus comprises a monitor for displaying an image, a moving picture reader for reading moving picture data, a memory for storing still image data obtained from the moving picture data, a display controller for displaying on the monitor a specified number of still image frames of the still image data, an image designator for allowing an operator to designate a still image frame for print among the specified number of still image frames, and an image outputter for outputting still image data corresponding to the designated still image frame as print data.

According to another aspect of the invention, a digital image processing method comprises reading out moving picture data recorded on a recording medium, obtaining still image data from read moving picture data, storing obtained still image data having a number of still image frames in a memory, displaying on a monitor a specified number of still image frames of the still image data, allowing an operator to designate a still image frame for print among the specified number of still image frames, and outputting still image data corresponding to the designated still image frame as print data.

According to still another aspect of the invention, a program product comprises a program configured to process digital image by the above-mentioned steps, and a signal bearing media bearing the program.

According to yet still another aspect of the invention, a digital image printing system comprises a monitor for displaying an image, a moving picture reader for reading out moving picture data recorded on a recording medium, a memory for storing still image data obtained from read moving picture data, a display controller for displaying on the monitor a specified number of still image frames of the still image data, an image designator for allowing an operator to designate a still image frame for print among the specified number of still image frames, an image outputter for outputting still image data corresponding to the designated still image frame as print data, and a printer for printing the designated still image frame on print paper based the outputted print data.

These and other objects, features and advantages of the present invention will become more apparent upon a reading of the following detailed description and accompanying drawing.

DESCRIPTION OF THE PREFERRED EMBODIMENTS OF THE INVENTION

Figure 1:
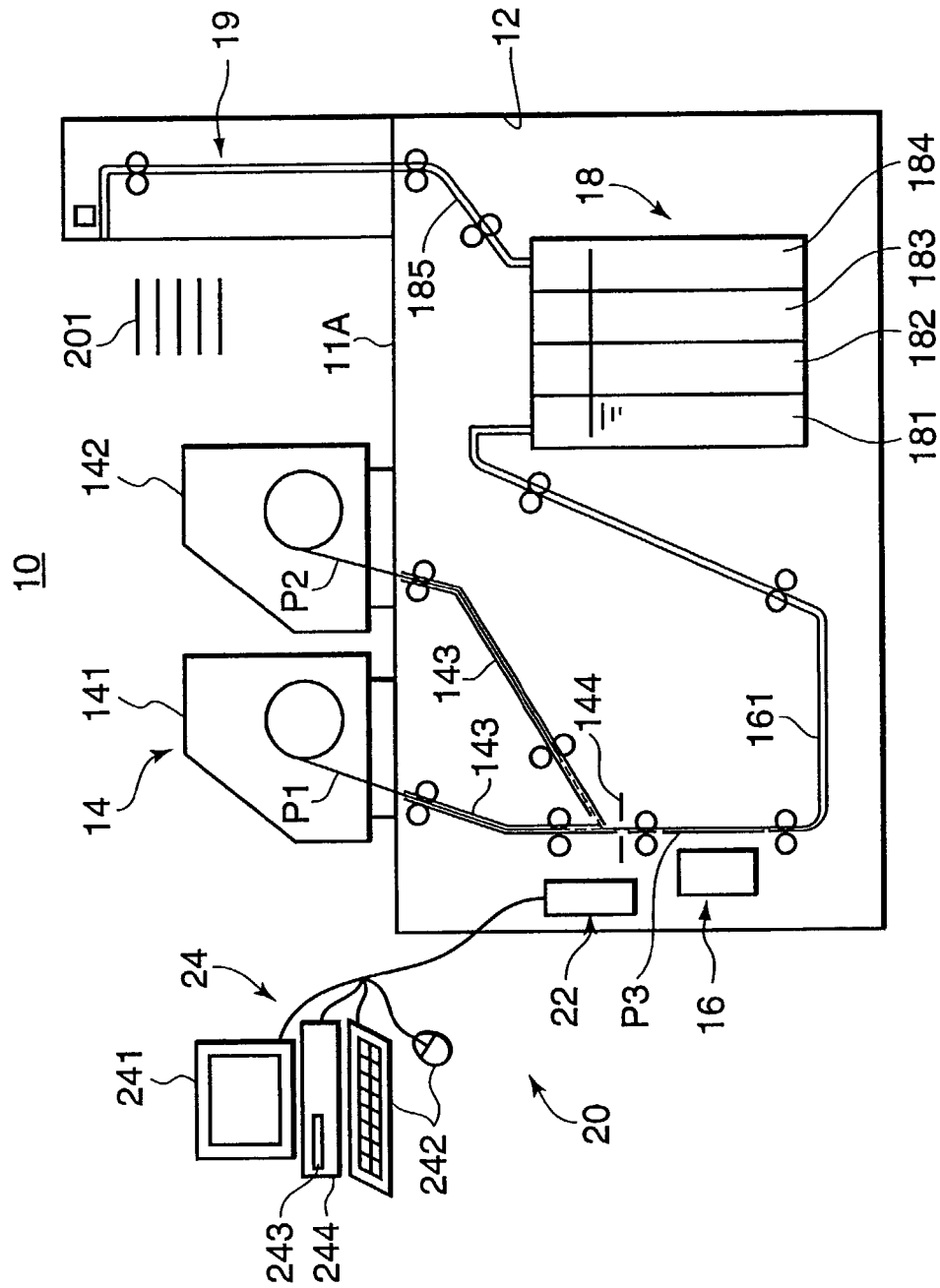
FIG. 1 is a diagram schematically showing an arrangement of a digital image printing system according to an embodiment of the invention.

Preferred embodiments of the invention are described with reference to the accompanying drawings. Referring to FIG. 1 schematically showing a configuration of a digital image printing system embodying the invention, a digital image printing system 10 mainly performs operation of converting moving picture data photographed by a digital camera and stored in a compression format or without compression format into still image data having a number of still image frames, displaying a still image frame or still image frames for operator's print selection, printing selected still images on printing paper.

The digital image printing system 10 comprises a housing 12, a photosensitive paper supplier 14, an exposure device 16, a developing unit 18, a drying unit 19, a main controller 22, and an operating section 24.

Specifically, the photosensitive paper supplier 14 includes magazines 141, 142 which are mounted on a top part of the housing 12 and are respectively accommodated with rolls of photosensitive paper P1, P2 having different sizes. The exposure device 16 is disposed on a left side in FIG. 1 in the housing 12. The developing unit 18 is disposed on a right side in FIG. 1. The drying unit 19 is disposed on the top part of the housing 12. The main controller 22 is disposed in the vicinity of the exposure device 16 in the housing 12. The operating section 24 is provided on an outside of the housing 12.

The photosensitive paper supplier 14 is constructed in such a manner that the rolls of photosensitive paper P1, P2 are selectively withdrawable from the corresponding one of the magazines 141, 142. The photosensitive paper P1 (P2) dispensed from the magazine 141 (142) is supplied downstream with respect to a photosensitive paper supplying direction along a first transport route 143, and is cut into photosensitive paper sheets P3 (hereinafter, called "paper sheet P3") each having a specified length by a cutter 144 disposed at a terminal end of the first transport route 143.

The exposure device 16 is adapted to expose paper sheets P3 to light one after another. Specifically, the exposure device 16 includes laser beam emitters respectively adapted for outputting beams of laser light of three primary colors, Red (R), Green (G), and Blue (B), a light modulating member for modulating the laser light emitted from each laser beam emitter, and a polygon mirror for directing the modulated laser light to a predetermined exposure position. The exposure device 16 includes a second transport route 161 along which a paper sheet P3 is transported to the predetermined exposure position and then is transported to the developing unit 18 after the image exposure.

The developing unit 18 includes a plurality of processing tanks 181, 182, 183, 184 in which a developer, a fixer, a bleach liquor, and a stabilizer are respectively contained in this order. Allowing photosensitive paper sheets P3 carried into the developing unit 18 along the second transport route 161 to pass the tanks 181 to 184 one after another sequentially in this order enables to develop the light image on the photosensitive paper sheet P3 after the image exposure. The developing unit 18 is provided with a third transport route 185 along which a photosensitive paper sheet P3 after the development is transported to the drying unit 19.

The drying unit 19 is adapted to dry photosensitive paper sheets P3 which have been transported from the developing unit 18 along the third transport route 185 one after another with heated air. After having been dried in the drying unit 19, the photosensitive paper sheets P3 are sequentially discharged onto a tray 201 in a stacked state.

The main controller 22 is adapted to centrally control operations of the digital image printing system such as image data processing and laser beam processing. The operating section 24 is electrically connected to the main controller 22, and includes a monitor 241, an input section 242, and a recording medium driving section 244 having an image reader 245 (see FIG. 2) and an image writer 246 (see FIG. 2). The monitor 241 is adapted for displaying a screen image or its equivalent for allowing an operator to designate various processing conditions such as image processing conditions of the exposure device 16. The input section 242 has a keyboard, mouse, etc. for allowing an operator to input and designate the processing condition(s). The image reader 245 is adapted to read image data recorded in an external recording medium when the external recording medium is loaded in a mounting portion 243 of the operating section 24. The image writer 246 is adapted to write image data on external recording medium when the external recording medium is loaded in the mounting portion 243. The main controller 22 and the operating section 24 mainly constitute a digital image processing apparatus 20.

Figure 2:
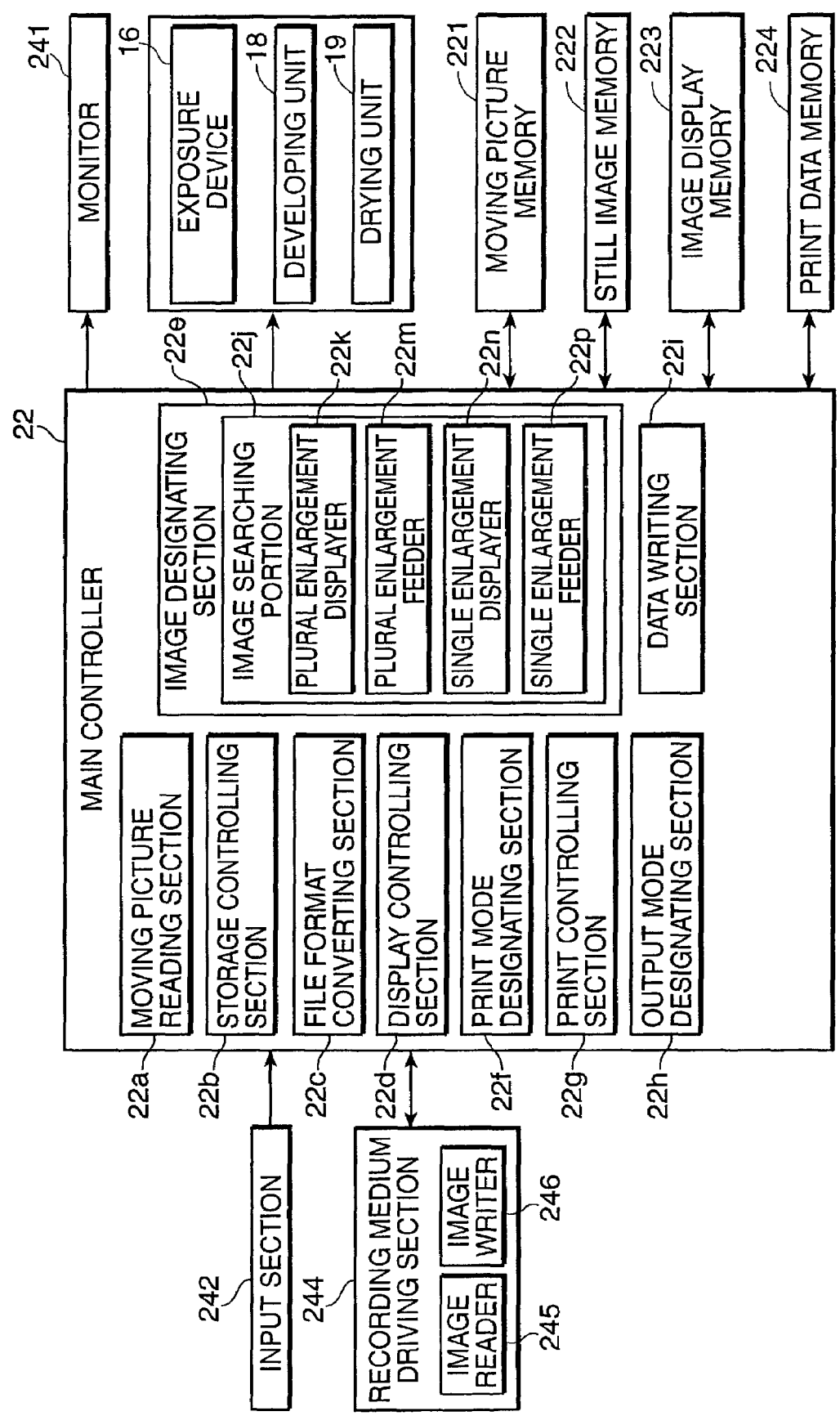
FIG. 2 is a block diagram showing a control operation of a main controller of a digital image processing apparatus provided in the digital image printing system.

FIG. 2 is a control block diagram showing how image data is processed in the main controller 22. Specifically, the main controller 22 has a Central Processing Unit (CPU) for implementing computation, a Read Only Memory (ROM) in which a processing program and various data are recorded, and a Random Access Memory (RAM) for temporarily storing processed data.

The main controller 22 is electrically connected to a moving picture memory 221, a still image memory 222, an image display memory 223, etc. as well as to the monitor 241, input section 242, and recording medium driving section 244. The moving picture memory 221 is adapted to store moving picture data in a compression format, which is read out by the image reader 245 of the recording medium driving section 244. The still image memory 222 is adapted to store still image data obtained by converting the moving picture data as compressed data. The image display memory 223 is adapted to temporarily store a specified number of still image frames among a block of still image frames stored in the still image memory 222 for displaying on the monitor 241. These memories 221, 222, 223 are each comprised of an electrically rewritable memory such as Electrically Erasable and Programmable Read Only Memory (EEPROM). As mentioned, above, the recording medium driving section 244 includes the image reader 245 for reading image data (moving picture data) recorded in an external recording medium, and the image writer 246 for writing image data (still image data) on external recording medium.

The main controller 22 includes a moving picture reading section 22a, a display interval determining section 22b, a file format converting section 22c, a display controlling section 22d, an image designating section 22e, a print mode designating section 22f, a print controlling section 22g, an output mode designating section 22h, and a data writing section 22i each adapted for implementing a specified function. The image designating section 22e includes an image searching portion 22j. The image searching portion 22j has a plural enlargement displayer 22k, a plural enlargement feeder 22m, a single enlargement displayer 22n, and a single enlargement feeder 22p each adapted for implementing a specified function.

The moving picture reading section 22a controls the image reader 245 to read out moving picture data stored in an external recording medium when the external recording medium is mounted in a recording medium mounting portion 243 of the recording medium driving section 244. The moving picture data read out from the image reader 245 is recorded in the moving picture memory 221. The moving picture reading section 22a also controllably reads out moving picture data recorded in the moving picture memory 221.

The display interval determining section 22b is adapted to set the number of frames to be reduced from the total number of moving picture frames corresponding to a reproduction duration of the moving picture data read out by the image reader 245 so that a specified number of still image frames are stored in the still image memory 222 in correspondence to the reproduction duration (namely, the total number of moving picture frames) of the moving picture data read out by the image reader 245. In this embodiment, the number of still image frames to be stored in the still image memory 222 is set in advance (e.g., 100 frames of still images). Accordingly, in this embodiment, the display interval determining section 22b determines a reduction ratio of frame number with respect to the total number of moving picture frames corresponding to a reproduction duration of moving picture data read out by the image reader 245 based on a difference between the predetermined number of still image frames to be stored in the still image memory 222 and the total number of moving picture frames corresponding to the reproduction duration of the moving picture data read out by the image reader 245, and controllably stores the predetermined number of still image frames in the still image memory 222 while removing the still image frames corresponding to the total number of moving picture frames every specified number of frames. In the case where the reproduction duration of moving picture data is long (frame number of moving picture data is large), the reduction ratio of frame number increases, whereas in the case where the reproduction duration is short (frame number of moving picture data is small), the reduction ratio decreases. Hereinafter, the technique of removing still image frames corresponding to the moving picture frames every specified number of frames is called "frame reduction".

The idea of removing still image frames every specified number of frames is proposed for the following reason. If all the still image frames corresponding to the total number of moving picture frames corresponding to the reproduction duration of the moving picture data are to be stored in a memory, the memory is required to have a large storage capacity. Also, a long time is required for processing all the still image data stored in the memory for displaying on the monitor 241. It should be appreciated that even if a limited number of still image frames are stored in the still image memory 222 by removing still image frames corresponding to the total number of moving picture frames every specified number of frames, an optimal frame image is obtainable for the following reason. A moving picture before frame reduction consists of a series of moving picture frames. Accordingly, even if the still image memory 222 after the frame reduction does not store a still image frame corresponding to an optimal scene before the frame reduction, a still image frame corresponding to a scene next to or in the vicinity of the optimal scene before the frame reduction is stored in the still image memory 222. Therefore, actually there is no problem in obtaining data concerning the optimal scene from the still image memory 222 after the frame reduction. In other words, as far as there is substantially no incongruity between a still image frame corresponding to an optimal scene before frame reduction and a still image frame corresponding to a scene in the vicinity of the optimal scene, the still image frame corresponding to the scene in the vicinity of the optimal scene is handled as an optimal scene after the frame reduction even if the number of still image frames to be reduced increases.

The file format converting section 22c serves as an image converting section for converting moving picture data into still image data (namely, uncompressing compressed data). When moving picture data which has been read out by the image reader 245 and stored in the moving picture memory 221 in a moving picture file format such as MPEG is converted into still image data in a still image file format such as Joint Photographic Experts Group (JPEG), the still image data consists of a number of still image frames. The still image frames which have been converted in a still image file format are stored in the still image memory 222 in a state that time-related information (information relating to the time sequence at the time of photographing) is attached to each still image frame.

In this embodiment, all the moving picture frames are decoded into still image frames by the file format converting section 22c. As mentioned above, however, the predetermined number of still image frames are stored in the still image memory 222 by removing the still image frames corresponding to the total number of moving picture frames every specified number of frames. At the same time, each still image frame is stored in the still image memory 222 with its data amount (e.g. pixel number) reduced. Specifically, after the frame reduction, the main controller 22 performs data amount reduction with respect to each still image frame to be stored in the still image memory 222. Thus, implementing the image data amount reduction in combination with the frame reduction enables to downsize the capacity of the still image memory 222 and enhance high-speed image processing.

The display controlling section 22d controllably displays a group of still image frames in time series on the monitor 241 after the moving picture data in a moving picture file format is converted into still image data in a still image file format by the file format converting section 22c. In this embodiment, the display controlling section 22d is designed to display a predetermined number of frames (e.g. 25 frames) without displaying all the still image frames stored in the still image memory 222. In view of this, the display controlling section 22d determines the number of frames to be reduced based on a difference between the number (e.g. 100 frames) of still image frames stored in the still image memory 222 and the number (e.g. 25 frames) of still image frames to be displayed on the monitor 241 at the time of controllably displaying the still image frames. Thus, the block (e.g. 100 frames) of still image frames are removed every specified number of frames from the still image memory 222 for displaying the group (e.g. 25 frames) of still image frames on the monitor 241.

The image designating section 22e controllably allows an operator to designate one still image frame to be printed among a group of still image frames (e.g. 25 frames) which are displayed on the monitor 241 in time series. Specifically, the image designating section 22e is so configured as to designate a still image frame to be printed by allowing an operator to designate a desired still image frame among a group of still image frames displayed on the monitor 241 by way of the input section 242 including a keyboard and a mouse.

The print mode designating section 22f controllably allows an operator to selectively designate a first print mode and a second print mode. When the first print mode is designated, all the still image frames (e.g. 25 frames) displayed on the monitor 241 are printed frame after frame by a control operation of the display controlling section 22d. When the second print mode is designated, one still image frame in association with the group of still image frames (e.g. 25 frames) displayed on the monitor 241 is printed by a control operation of the display controlling section 22d.

In the second print mode, there are two options: one is a case where printed is one still image frame which is designated among a group of still image frames (e.g. 25 frames) displayed on the monitor 241 by a control operation of the display controlling section 22d; and the other is a case where printed is a hidden still image frame which is not displayed on the monitor 241 and is retrieved from a block (e.g. 100 frames) of still image frames stored in the still image memory 222 by making reference to a designated still image frame among a group of still image frames (e.g. 25 frames) displayed on the monitor 241, wherein the hidden still image frame is one still image frame among the block of still image frames stored in the still image memory 222 except the still image frame group displayed on the monitor 241.

In this embodiment, an operator is allowed to selectively designate any one of the first and second modes including the two options by manipulating the input section 242.

The print controlling section 22g controls a printer to print a still image frame designated by the image designator onto a photosensitive paper sheet P3 (see FIG. 1) by activating the exposure device 16 (see FIG. 1), the developing processing section 18 (see FIG. 1), etc.

The output mode designating section 22h controllably allows an operator to selectively designate a first output mode and a second output mode. When the first output mode is designated, a still image frame designated by the image designator is printed on a paper sheet P3 (see FIG. 1). When the second output mode is designated, data on a still image frame which is designated by the image designator and is to be printed on a paper sheet P3 is recorded on an external recording medium mounted in the mounting portion 243 of the recording medium storage driving section 244. In this embodiment, an operator is allowed to selectively designate one of the first and second output modes.

The data writing section 22i controllably writes or records data on a still image frame on an external recording medium mounted in the mounting portion 243 of the recording medium driving section 244 in place of printing a still image frame onto a paper sheet P3 by activating the image writer 246 of the recording medium driving section 244 in response to designation of the second output mode.

The print mode designating section 22f, the print controlling section 22g, the output mode designating section 22h, the data writing section 22i and the image writer 246 combinedly compose a data outputter.

The image searching portion 22j controllably retrieves one still image frame from a block (e.g. 100 frames) of still image frames stored in the still image memory 222 by making reference to a designated still image frame among a group of still image frames (e.g. 25 frames) displayed on the monitor 241 in response to designation of the second print mode.

More specifically, in the case where a group of still image frames (e.g. 25 frames) displayed on the monitor 241 includes a still image frame corresponding to an optimal scene or a still image frame corresponding to a scene in the vicinity of the optimal scene, one of the group of the still image frames displayed on the monitor 241 is designated. In the case where the group of still images frame displayed on the monitor 241 does not include a still image frame corresponding to an optimal scene or a still image frame corresponding to a scene in the vicinity of the optimal scene, a still image frame is designated among the block (e.g. 100 frames) of still image frames stored in the still image memory 222 except the still image frame group (e.g. 25 frames) displayed on the monitor 241. Thus, in this embodiment, an operator is allowed to designate a desired still image frame by manipulating the input section 242. The input section 242 and the image searching portion 22j compose an image searcher.

The plural enlargement displayer 22k controllably displays a set of a specified number of still image frames including a designated still image frame (e.g. six frames of still images in time series including the designated still image frame) on the monitor 241 at a size (second size or medium size) larger than the size (first size or smallest size) at which the group of still image frames are initially displayed on the monitor 241 when the one still image frame is designated among the group (e.g. 25 frames) of still image frames displayed on the monitor 241 in response to designation of the second print mode.

Allowing a series of still image frames including a designated still image frame to be displayed on the monitor 241 at the second size larger than the first size at which the group of still image frames are initially displayed on the monitor 241 by a control operation of the plural enlargement displayer 22k enables to overcome the drawback that a still image frame of a relatively small size makes it difficult for an operator to identify and designate a desired still image frame among a group of still image frames displayed on the monitor 241. In this embodiment, an operator is allowed to designate one of a group of still image frames displayed on the monitor 241 by manipulating the input section 242. The plural enlargement displayer 22k and the input section 242 compose a plural enlargement display controller.

Figure 6:
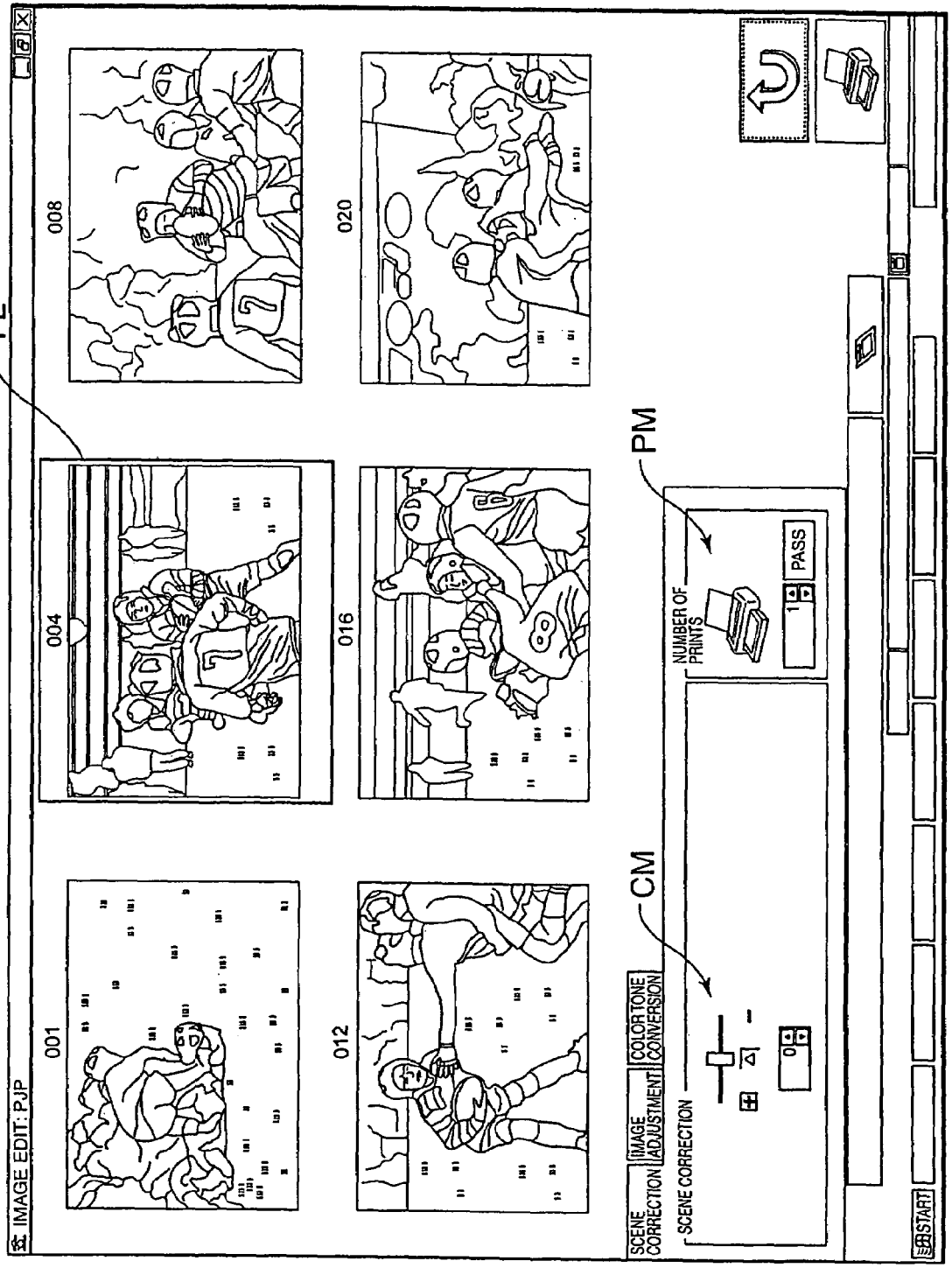
FIG. 6 is a diagram showing another exemplified screen image to be displayed on the monitor.

The plural enlargement feeder 22m controllably displays a series of still image frames (e.g. 6 frames of still images) at the second size on the monitor 241 while feeding the frames in time series within a viewable range corresponding to a group of still image frames (e.g. 25 frames of still images) displayed on the monitor 241 (see FIG. 6). In this embodiment, the feed operation of the plural enlargement feeder 22m is activated when an operator clicks a feed button (scroll button) CM (see FIGS. 6 and 7) displayed on the monitor 241 with the mouse of the input section 242. The plural enlargement feeder 22m and the input section 242 compose a plural enlargement feed controller.

The single enlargement displayer 22n controllably displays a particular single still image frame at a size (third size or largest size) larger than the second size among a series (e.g. 6 frames) of still image frames which are displayed on the monitor 241 at the second size when the particular still image frame is designated. Thus, further enlargedly displaying a particular designated still image frame among a series of still image frames enables to overcome the drawback that the second size of the series of still images frames which are displayed on the monitor 241 by a control operation of the plural enlargement displayer 22k and the plural enlargement feeder 22m is not large enough for an operator to identify and designate a desired still image frame easily. In this embodiment, an operator is allowed to designate a particular still image frame displayed at the third size by manipulating the input section 242. The single enlargement displayer 22n and the input section 242 compose a single enlargement display controller.

The single enlargement feeder 22p controllably displays the block of still image frames stored in the still image memory 222 sequentially at the third size frame after frame on the monitor 241 while reading out the block of still image frames in time series therefrom by a control operation of the single enlargement displayer 22n. In this embodiment, the feed operation of the single enlargement feeder 22p is activated when an operator clicks the feed button (scroll button) CM (see FIGS. 6 and 7) displayed on the monitor 241 with the mouse of the input section 242. The single enlargement feeder 22p and the input section 242 compose a single enlargement feed controller.

Figure 3:
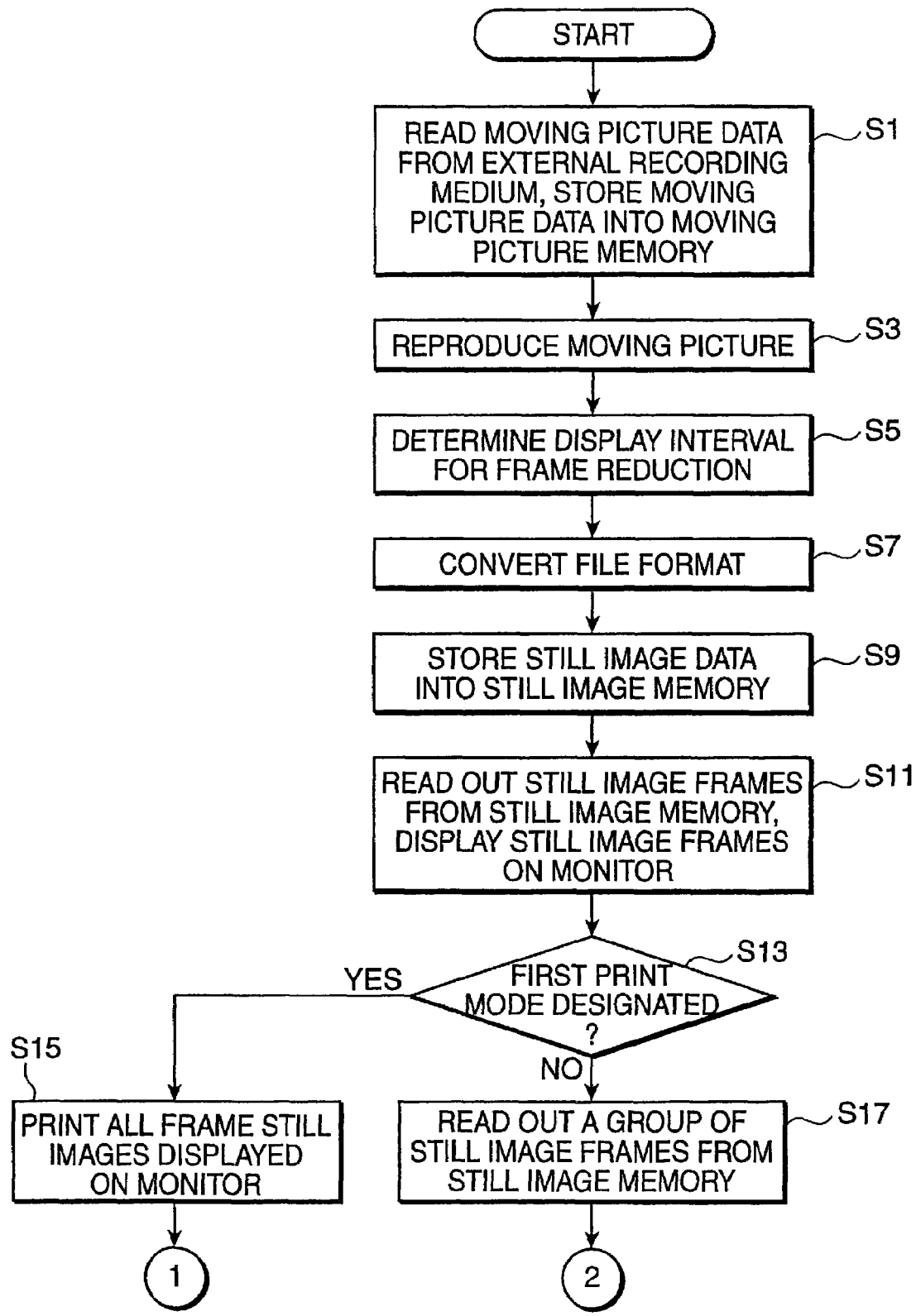
FIG. 3 is a first half of a flowchart showing an operation of the digital image processing apparatus.
Figure 4:
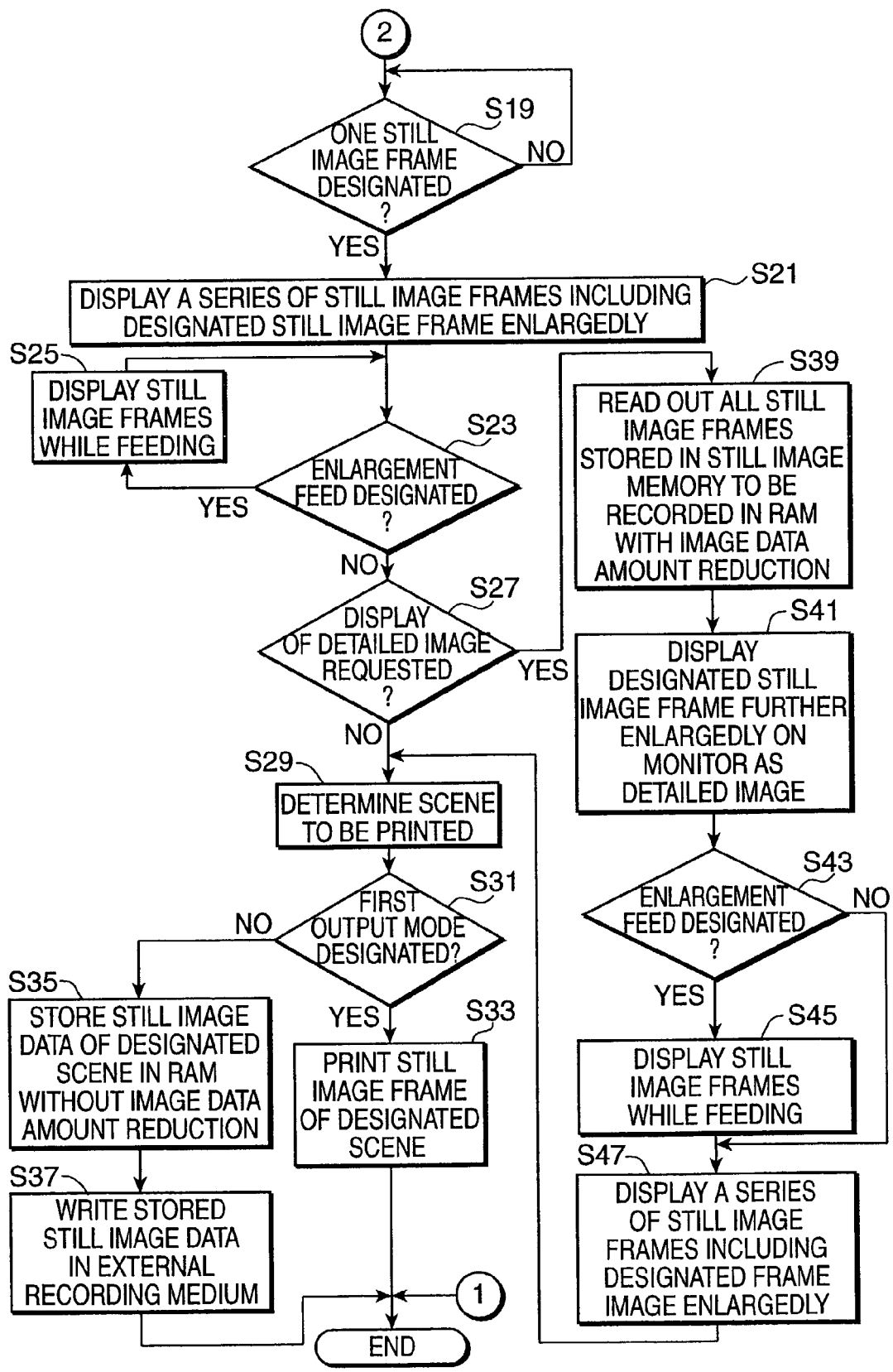
FIG. 4 is a latter half of the flowchart showing the operation of the digital image processing apparatus.

FIGS. 3 and 4 are a set of flowcharts showing an operation of the digital image printing system 10 having the above configuration. When an operator inserts an external recording medium in which data on moving pictures photographed by a digital camera are recorded in a moving picture file format such as MPEG into the mounting portion 243 of the recording medium driving section 244, and depresses a START key provided on the keyboard of the input section 242, driving of the recording medium driving section 244 is initiated. Then, the moving picture data recorded in the external recording medium is read out by a control operation of the moving picture reading section 22a to allow the moving picture data to be recorded in the moving picture memory 221 in the moving picture file format (Step S1).

When the moving picture data is recorded in the moving picture memory 221, the moving picture reading section 22a implements reproduction of the recorded moving picture data (Step S3). The display interval determining section 22b determines the number of frames (display interval) to be reduced with respect to the total number of moving picture frames corresponding to the reproduction duration of the moving picture data so that a predetermined number of still image frames are stored in the still image memory 222 based on the duration required for the moving picture reproduction (the total number of moving picture frames corresponding to the reproduction duration of the moving picture data) (Step S5).

Subsequently, the moving picture data stored in the moving picture memory 221 in the moving picture file format is converted into still image data in a still image file format by the file format converting section 22c (Step S7). The still image data in the still image file format which are obtained by the file format conversion in the file format converting section 22c are temporarily stored in a recording medium such as an RAM, and are recorded in the still image memory 222 (Step S9) after the frame reduction in Step S5. Along with the frame reduction, image data amount reduction (e.g. pixel number reduction) is also performed with respect to each still image frame to be stored in the still image memory 222 to record a block of still image frames in the still image memory 222 in a state that the image data amount with respect to each still image frame is reduced.

Figure 5:
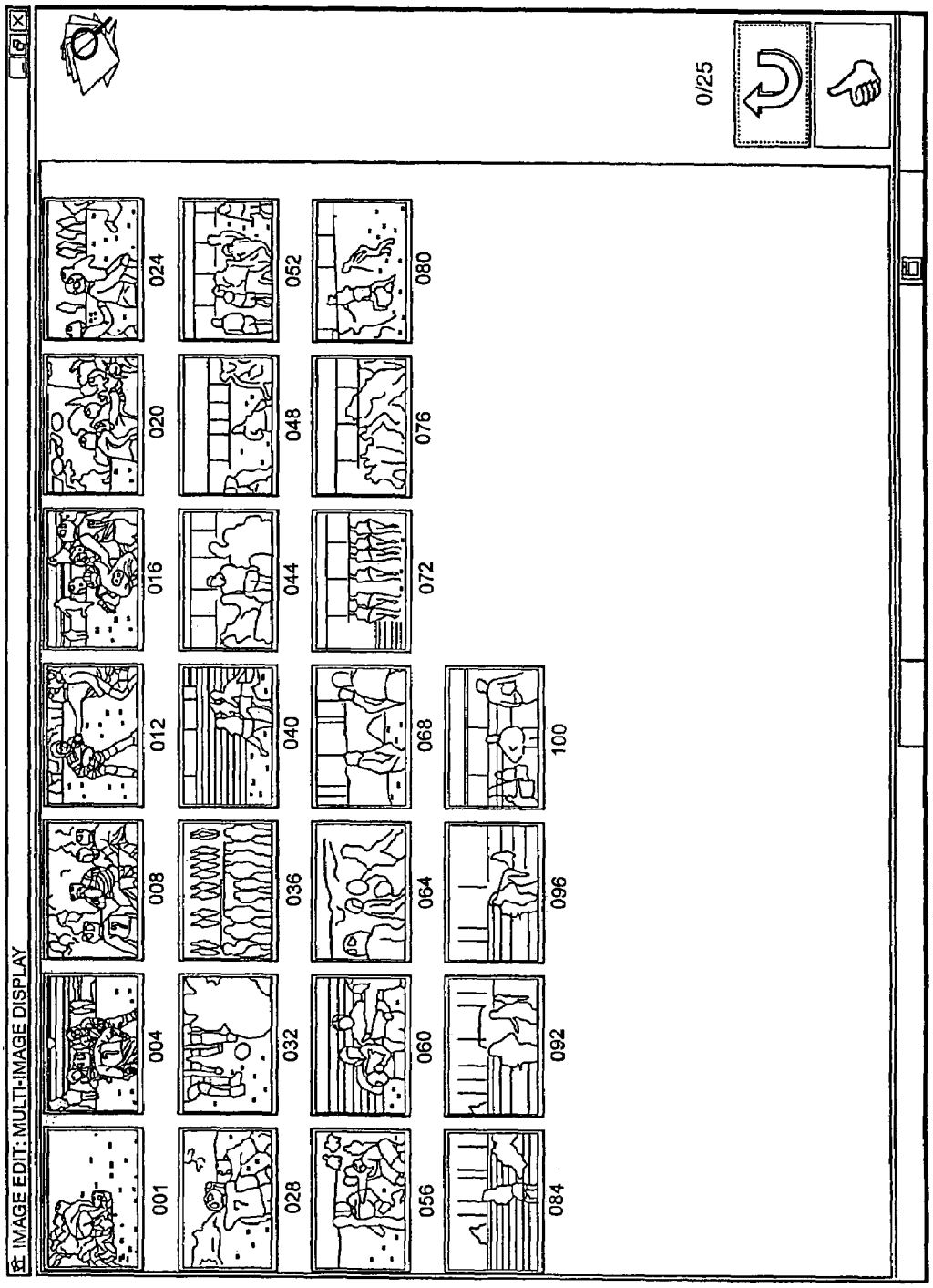
FIG. 5 is a diagram showing an exemplified screen image to be displayed on a monitor of the digital image printing system.

Subsequently, the block (e.g. 100 frames) of still image frames recorded in the still image memory 222 are removed every specified number of frames so that a predetermined number (e.g. 25 frames) of still image frames are displayed on the monitor 241 in time series by a control operation of the display controlling section 22d (Step S11). The data on the group of still image frames are temporarily stored in the image display memory 223 for displaying on the monitor 241. FIG. 5 exemplarily shows a screen image of the monitor 241 in which a group of still image frames starting from Frame No. 001 at an uppermost left-end position on the screen image and ending at Frame No. 100 at a lowermost right-end position on the screen image are displayed in time series on the monitor 241.

Next, the main controller 22 controls a judging portion (not shown) to judge whether designated is the first print mode of printing all the still image frames in a group displayed on the monitor 241 or the second print mode of printing one still image frame in association with the group of still image frames displayed on the monitor 241 (Step S13). The designation of the print mode is executed by a control operation of the print mode designating section 22f in response to manipulation of the input section 242 after confirming that the group of still image frames are displayed on the monitor 241.

In the case where the first print mode is designated (YES in Step S13), the parts necessary for printing including the exposure device 16, the developing unit 18, and the drying unit 19 are activated in response to a control operation of the print controlling section 22g to print all the still image frames displayed on the monitor 241 onto paper sheets P3 one after another (Step S15). When printing of the final still image frame of the still image frame group displayed on the monitor 241 is completed, the above-mentioned series of control operations concerning the printing is terminated. The print controlling operation is implemented according to the following procedures.

Specifically, when the first print mode is designated, data on moving pictures photographed by a digital camera are read out from the moving picture memory 221 and are converted into still image data in a still image file format by the file format converting section 22c. Still image data corresponding to a group of still image frames which are displayed on the monitor 241 are temporarily recorded in a recording medium such as an RAM without image data amount reduction, and are sequentially printed onto paper sheets P3.

In the case where the second print mode is designated, data on a group of still image frames identical to the one in Step S11 are read out among the data on a block (e.g. 100 frames) of still image frames stored in the still image memory 222 for storage in a recording medium such as an RAM (Step S17). Step S17 is different from Step S11 in that the data on the group of still image frames are read out from the still image memory 222 while reducing the image data amount with respect to each still image frame by interpolating the image data for enlargement display to be implemented later. Next, the main controller 22 controls a judging portion (not shown) to judge whether one still image frame is designated for printing among the group of still image frames displayed on the monitor 241 (Step S19).

The designation of the one still image frame is executed when an operator manipulates the input section 242. If the judgment result in Step S19 is negative (NO in Step S19), the flow waits until the judgment result becomes affirmative. If the judgment result is affirmative (YES in Step S19), a series (e.g. 6 frames) of still image frames including the designated still image frame (for instance, a still image frame identified by Frame No. 001) are displayed one after another in time series on the monitor 241 at a second size larger than the first size at which the group of still image frames are displayed on the monitor 241 by a control operation of the plural enlargement displayer 22k of the image searching unit 22j of the image designating section 22e. The data on the series of still image frames displayed at the second size on the monitor 241 are temporarily stored in the image display memory 223 to be read out therefrom for displaying on the monitor 241.

FIG. 6 is a diagram showing an exemplified screen image of the monitor 241 in which a series of still image frames starting from the still image frame identified by Frame No. 001 at an uppermost left-end position on the screen image and ending at the still image frame identified by Frame No. 020 at a lowermost right-end position are displayed at the second size in time series (intermediate enlargement display). In FIG. 6, the feed button CM for allowing an operator to execute enlargement feed and a print button PM for allowing an operator to designate the number of prints are respectively displayed on a lower left part and a lower middle part on the monitor 241.

Subsequently, the main controller 22 controls a judging portion (not shown) to judge whether enlargement feed is designated (Step S23). The designation of enlargement feed is implemented when an operator manipulates the feed button CM displayed on the monitor 241 in FIG. 6 by way of the input section 242. The feed button CM includes a forward-direction command section indicated by the symbol "+" and a backward-direction command section indicated by the symbol "−". Clicking the section of the symbol "+" enables an operator to feed the still image frame one frame forward, whereas clicking the section of the symbol "−" enables an operator to feed the still image frame one frame backward.

Referring back to Step S23, if the judgment result in Step S23 is affirmative (YES in Step S23), a series of still image frames are displayed at the second size one after another by a designated number and in a designated feed direction in response to a control operation of the plural enlargement feeder 22m of the image searching portion 22j of the image designating section 22e within the viewable range corresponding to the group of still image frames (e.g. 25 frames as shown in FIG. 5) displayed on the monitor 241 (Step S25). When the intermediate enlargement display of the series of still image frames is completed, the flow returns to Step S23.

The plural enlargement feed operation in Step S25 is implemented according to the following procedure. Specifically, each time the feed button CM is manipulated, data on a leading still image frame in the feed direction among the data on still images frames temporarily stored in the image display memory 223 is erased one by one, while at the same time, data on still image frames are read out from the still image memory 222 by the number identical to the one of the erased still image frames for temporary storage in the image display memory 223. Thus, the recorded contents in the image display memory 223 are updated, and data on still image frames in conformance with the updated contents are read out from the image display memory 223 frame after frame for displaying on the monitor 241.

On the other hand, if the judgment result in Step S23 is negative (NO in Step S23), the main controller 22 controls a judging portion (not shown) to judge whether a command to display a detailed screen image on the monitor 241 is designated (Step S27). Judgment result in Step S23 is regarded negative, and the flow proceeds to the next step, if it is verified, for example, that a specified key on the keyboard of the input section 242 is manipulated in Step S23. Judgment in Step S27 as to whether display of a detailed screen image is requested is implemented based on a judgment as to whether the input section 242 is manipulated (specified key on the keyboard is manipulated) to move a still image FL (in FIG. 6, the still image frame identified by Frame No. 004) forward or backward.

If the judgment result in Step S27 is negative (NO in Step S27), the flow proceeds to Step S29 in which a scene to be printed is determined by designating one still image frame among a series (e.g. 6 frames) of still image frames displayed on the monitor 241. Judgment result in Step S27 is regarded negative, and the flow proceeds to the next step when it is verified, for example, that a specified key on the keyboard of the input section 242 is manipulated in Step S27. The designation of the one still image frame in Step S29 is implemented, for example, by clicking the region on the screen image of the monitor 241 corresponding to the designated still image frame.

Next, the main controller 22 controls a judging portion (not shown) to judge whether designated is the first output mode of outputting still image data of a designated still image frame to print it onto a paper sheet P3 (see FIG. 1) or the second output mode of outputting still image data of a still image frame for print to record on an external recording medium loaded in the mounting portion 243 of the recording medium driving section 244 (Step S31). The designation of the output mode is executed by a control operation of the output mode designating section 22h in response to manipulation of the input section 242 by an operator.

In the case where the first output mode is designated (YES in Step S31), a still image frame (scene to be printed) designated by an operator is printed on a paper sheet P3 by activation of the parts necessary for printing such as the exposure device 16 and the developing unit 18 (Step S33). Thus, the above-mentioned series of control operations concerning the printing are terminated. The number of prints to be printed with respect to the designated scene is determined depending on clicking operation of an operator with respect to the print button PM in a printing process. A control operation of the printing process is implemented in accordance with the following procedures.

Specifically, if the first output mode is designated, data on moving pictures photographed by a digital camera are read out from the moving picture memory 221 and are converted into still image data in a still image file format by the file format converting section 22c. Among the data on the plurality of still image frames in the still image file format, data on a still image frame corresponding to a designated scene in Step S29 is recorded in the print data memory 224 such as an RAM without image data amount reduction for printing onto a paper sheet P3.

On the other hand, in the case where the second output mode is designated (NO in Step S31), data on moving pictures photographed by a digital camera are read out from the moving picture memory 221 and are converted into still image data in a still image file format by the file format converting section 22c. Among the data on the plurality of still image frames in the still image file format, data on a still image frame corresponding to a designated scene in Step S29 is stored in the print data memory 224 such as an RAM without image data amount reduction (Step S35). Subsequently, the data on the stored still image frame is written in an external recording medium loaded in the mounting portion 243 of the recording medium driving section 244 (Step S37). Thus, the above-mentioned series of control operations are terminated.

On the other hand, if the judgment result in Step S27 is affirmative, all the data on still image frames (e.g. 100 frames) stored in the still image memory 222 are read out therefrom while interpolating the image data for maximal enlargement display to be implemented later and are recorded in a recording medium such as an RAM along with image data amount reduction (Step S39). Thereafter, the still image frame designated in Step S27 is displayed on the monitor 241 as a detailed screen image at the third size larger than the second size at which the series of still image frames are displayed in Step S21 by a control operation of the single enlargement displayer 22n of the image searching portion 22j of the image designating section 22e (Step S41). It should be appreciated that data on the detailed screen image is temporarily stored in the image display memory 223, and is read out therefrom for displaying on the monitor 241.

Figure 7:
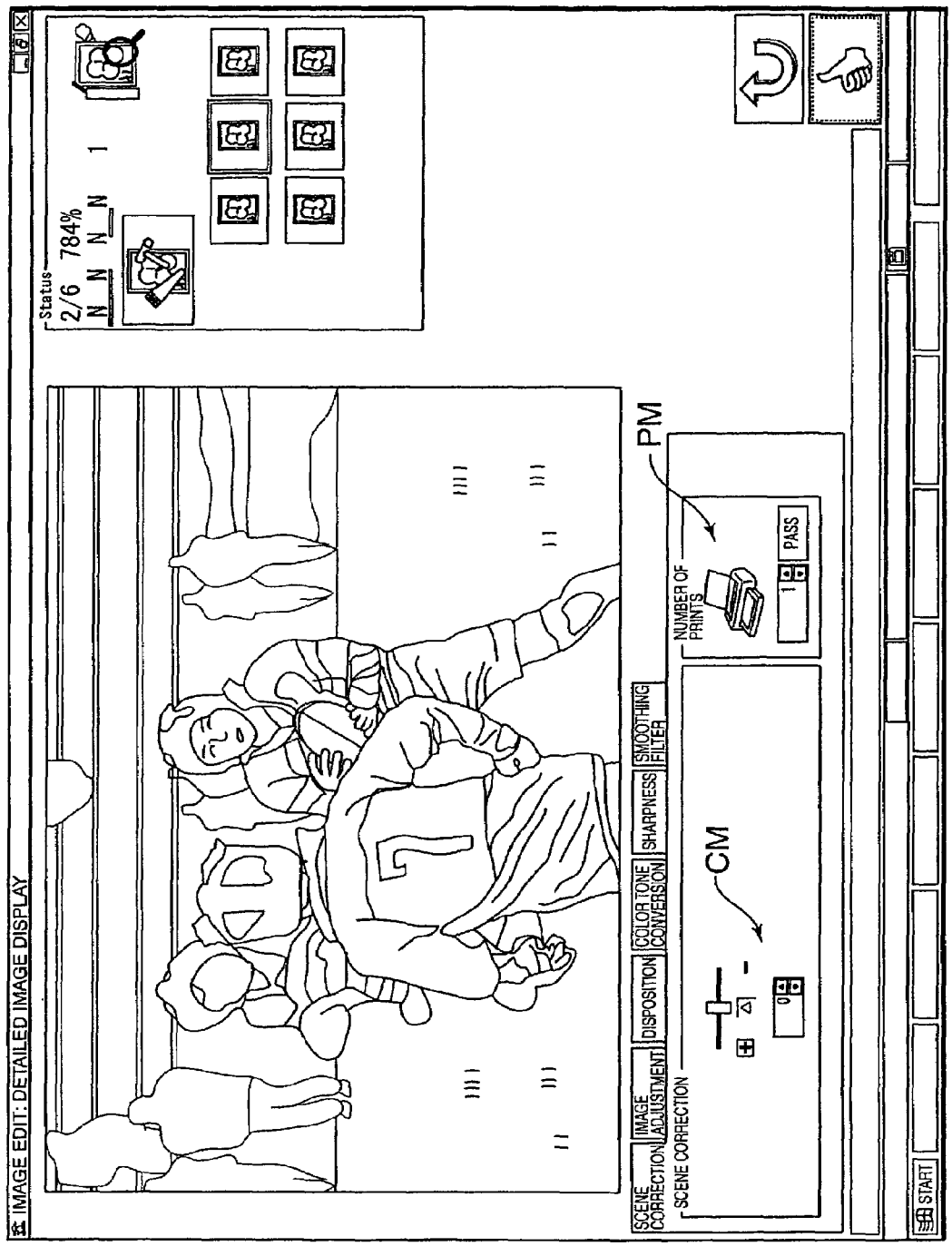
FIG. 7 is a diagram showing a still another exemplified screen image to be displayed on the monitor.

FIG. 7 is a diagram of an exemplified screen image on the monitor 241 showing that the still image frame identified by Frame No. "004" in FIG. 6 is displayed as a detailed screen image (maximal enlargement display). Similar to FIG. 6, the feed button CM and the print button PM displayed on the monitor 241 in FIG. 7 respectively adapted for allowing an operator to execute feeding and to designate the number of prints are displayed on the lower left part and the lower middle part of the monitor 241, respectively.

Referring back to the flowchart of FIG. 4, after the detailed screen image is displayed in Step S41, the main controller 22 controls a judging portion (not shown) to judge whether the enlargement feed is designated (Step S43). Similar to the case shown in FIG. 6, the designation of feed is implemented when an operator manipulates the feed button CM displayed on the monitor 241 in FIG. 7 by way of the input section 242. The feed button CM includes a forward-direction command section indicated by the symbol "+" and a backward-direction command section indicated by the symbol "−". Clicking the section of the symbol "+" enables an operator to feed the still image frame one frame forward, whereas clicking the section of the symbol "−" enables an operator to feed the still image frame one frame backward.

If the judgment result in Step S43 is affirmative (YES in Step S43), the single enlargement feeder 22p of the image searching portion 22j of the image designating section 22e is activated to display a designated number of still image frames at the third size in the designated forward or backward direction frame after frame among the block of still image frames stored in the still image memory 222 in Step S39 (Step S45). When the sequential display of the designated number of still image frames at the third size is terminated, the plural enlargement displayer 22k of the image searching portion 22j of the image designating section 22e is activated to display the same number of still image frames as the one displayed in Step S21 (e.g. 6 frames) with the same size (i.e. second size) as displayed in Step S21 on the monitor 241 (Step S47). It should be appreciated that data on the series of still image frames in Step S47 is temporarily stored in the image display memory 223, and read out therefrom for displaying on the monitor 241.

The plural enlargement feed operation in Step S45 is implemented in accordance with the following procedure. Specifically, each time the feed button CM is manipulated, data on a leading still image frame in the feed direction among the data on still image frames temporarily stored in the image display memory 223 is erased one by one, while at the same time, data on newly displayed still image frames is read out from the recording medium such as an RAM which stores the data on the block of still image frames (see Step S39) for temporary storage in the image display memory 223. Thus, the recorded contents in the image display memory 223 are updated, and data on still image frames in conformance with the updated contents are read out from the image display memory 223 one after another for displaying on the monitor 241. In this embodiment, the feeding in Step S45 is implemented frame by frame. Alternatively, the feeding in Step S45 may be implemented in terms of plural still image frames as a unit.

Referring back to FIG. 4, if the judgment result in Step S43 is negative, the flow goes to Step S47 by skipping Step S45 to allow the plural enlargement displayer 22k of the image searching portion 22j of the image designating section 22e to display the same number (e.g. 6 frames) of still image frames including the still image frame that has been displayed at the third size in Step S41 with the same size (second size) as the one displayed in Step S21 on the monitor 241. Judgment result in Step S43 is regarded negative, and the flow proceeds to the next step, if it is verified, for example, that a specified key on the keyboard of the input section 242 is manipulated in Step S43.

After a series of still image frames are displayed at the second size on the monitor 241 in Step S47, the flow goes to Step S29 to determine the scene to be printed. The still image frame corresponding to the scene to be printed is the one designated in Step S41 or Step S45.

As mentioned above, the digital image processing apparatus according to the embodiment is so configured that the file format converting section 22c converts moving picture data stored in the moving picture memory 221 in a moving picture file format into still image data in a still image file format to display a still image frame or frames on the monitor 241. In this arrangement, an operator is allowed to designate a still image frame or frames to be printed among the still image frames displayed on the monitor and to print a still image frame or frames corresponding to or in association with the designated still image frame(s) on printing paper. This arrangement enables an operator to easily designate a still image frame or frames to be printed by viewing the screen image displayed on the monitor 241, while securely allowing the designated still image frame or frames to be printed. This arrangement provides a user-friendly digital image printing system, and also provides a user-friendly digital image processing method and digital image processing program.

The invention is not limited to the foregoing embodiment, and is applicable to a variety of modifications and alterations as described below according to needs.

(1) In the above embodiment, the number of still image frames to be recorded in the still image memory 223 is fixed (e.g. 100 frames) irrespective of the number of moving picture frames. Alternatively, the number of still image frames to be recorded in the still image memory 223 may be varied in proportion to the number of moving picture frames. Namely, when the number of moving picture frame is large, the number of still image frames to be recorded in the still image memory 223 may increase, whereas when the number of moving picture frame is small, the number of still image frames to be recorded in the still image memory 223 may decrease.

(2) In the above embodiment, a predetermined number of still image frames are displayed on the monitor by implementing the frame reduction. Alternatively, in the case where the number of still image frames to be displayed on the monitor is small or in an equivalent condition, still image frames may be displayed without the frame reduction.

In the above embodiment, in displaying a still image frame on the monitor with image data amount reduction, still image data is stored in the still image memory 222 in a state that data on each still image frame has its image data amount (e.g. pixel number) reduced. Alternatively, the still image data may be stored in the still image memory 222 without image data amount reduction, and image data amount reduction may be implemented when the display controlling section 22d, plural enlargement displayer 22k, plural enlargement feeder 22m, single enlargement displayer 22n, and single enlargement feeder 22p are activated to controllably display a still image frame or frames on the monitor 241.

Specifically, image data amount reduction may be implemented in temporarily storing still image data from the still image memory 222 into the image display memory 223 to display a still image frame or frames on the monitor 241. In this altered arrangement, the data amount (e.g. pixel number) to be reduced in image data amount reduction may be varied depending on the size of a still image frame to be displayed on the monitor 241 when the display controlling section 22d, plural enlargement displayer 22k, plural enlargement feeder 22m, single enlargement displayer 22n, and single enlargement feeder 22p are activated to controllably display a still image frame or frames on the monitor 241.

(3) In the above embodiment, in the case where the second print mode is designated, one still image frame is retrieved from the block of still image frames stored in the still image memory 222. Alternatively, one still image frame may be directly retrieved from still image data that has been obtained by file format conversion in the file format converting section 22c without retrieval from the still image memory 222.

(4) In the foregoing embodiment, designated is the first output mode of printing a still image frame onto a paper sheet P3 or the second output mode of writing data on a still image frame to be printed on a paper sheet P3 on an external recording medium loaded in the mounting portion 243 of the recording medium driving section 244. Alternatively, unless otherwise specified, the first output mode may automatically be activated, and the second output mode may be activated if designated.

(5) In the above embodiment, the exposure device 16 of the digital image printing system 10 is so designed as to perform image exposure with laser light. Alternatively, various methods such as ink jet printing and ink ribbon printing other than the light exposure method may be applicable. In the altered arrangement of adopting ink jet printing or ink ribbon printing, the developing unit 18 and the drying unit 19 may be omitted. Further, in the altered arrangement, printing paper to bear a still image is not a photosensitive roll but an ordinary cut copy sheet. In view of this, various types of printing material including a photosensitive roll and a cut copy sheet are included in the term "printing paper" throughout the description of the present specification.

(6) In the above embodiment, a digital image processing method and a digital image processing program are applied to the digital image printing system 10. Such a digital image processing method and digital image processing program may be applicable to a system using a personal computer and a printer (including an ink jet printer). In other words, the inventive digital image processing apparatus may be usable together with a personal computer and a printer by implementing the inventive digital image processing method and the inventive digital image processing program.

(7) In the above embodiment, upon designation of one still image frame among a group of still image frames (e.g. 25 frames) displayed on the monitor 241, the plural enlargement displayer 22k is activated to display a series (e.g. 6 frames) of still image frames including the designated still image frame at the second size (medium size) in time series on the monitor 241. Furthermore, upon designating maximal enlargement display of a still image frame as a detailed screen image, the single enlargement displayer 22n is activated to display the designated still image frame as a detailed screen image at the third size (largest size) on the monitor 241.

Alternatively, one still image frame may be displayed as a detailed screen image at the third size by a control operation of the single enlargement displayer 22n upon designation of the one still image frame among the group of still image frames (e.g. 25 frames) displayed on the monitor 241 without intermediate enlargement display by the plural enlargement displayer 22k. In such an altered arrangement, a still image frame is displayed as a detailed screen image in time series while feeding the frames one by one or by a specified number of frames as a unit by a control operation of the single enlargement feeder 22p. In the altered plural enlargement feed operation, a still image frame may be retrieved from a group (e.g. 25 frames) of still image frames displayed on the monitor 241 or from a block (e.g. 100 frames) of still image frames stored in the still image memory 222.

Alternatively, the single enlargement displayer 22n or an equivalent display controller may be activated to display the number of still image frames obtained from moving picture data by a file format conversion in the file format converting section 22c frame after frame at a specified size on the monitor 241 without displaying a group (e.g. 25 frames) of still image frames by a control operation of the display controlling section 22d and without intermediate enlargement display by a control operation of the plural enlargement displayer 22k. The sequential display of still image frames may be executed upon manipulation of the input section 242 or the like.

In the above altered arrangement, the size of the still image frame to be displayed on the monitor 241 is not limited and may include the first size (smallest size among the displayable sizes in the embodiment) as displayed by a control operation of the display controlling section 22d, the second size (medium size among the displayable sizes in the embodiment) as displayed by a control operation of the plural enlargement displayer 22k, and the third size (largest size among the displayable sizes in the embodiment) as displayed by a control operation of the single enlargement displayer 22n. In case of sequentially displaying still image frames, the single enlargement feeder 22p or its equivalent plural enlargement feed controller may be activated to display the still image frames in time series on the monitor 241 while feeding the frames one by one or by a specified number of frames as a unit. In the plural enlargement feed operation, still image frames may be retrieved from a block (e.g. 100 frames) of still image frames stored in the still image memory 222. As a further altered arrangement, the still image frames may be at randomly displayed in place of time-series display upon manipulation of the input section 242 or the like.

In this way, even in a case where all the frame still images obtained by file format conversion in the file format converting section 22c are displayed sequentially on the monitor 241, an operator is easily enabled to designate a still image frame corresponding to an optimal scene to be printed or a still image frame corresponding to a scene in the vicinity of the optimal scene on the monitor 241. Thus, this arrangement provides a user-friendly digital image printing system and provides a user-friendly digital image processing method and digital image processing program to be applied to the digital image processing apparatus or its equivalent.

Similar to the embodiment, in the altered arrangement of sequentially displaying all the still image frames obtained from the moving picture data by file format conversion in the file format converting section 22c frame after frame on the monitor 241, the number of still image frames may be displayed with image data amount reduction, whereas the number of still image frames may be printed without image data amount reduction.

(8) In the above embodiment, the moving picture data are stored in the moving picture memory 221 in a moving picture file format such as MPEG as compressed data in such a manner that a difference between raw data and reference data exists as image data with respect to each moving picture frame. Alternatively, moving picture data may consist of a series of still image frames in which data on all the moving picture frames are stored without compression. In the case where the moving picture data is converted into still image data consisting of a series of still image frames without data compression, the still image frame(s) may be directly obtained from the moving picture data without file format conversion in the file format converting section 22c.

(9) In the above embodiment, the digital image processing apparatus 20 is so configured as to convert data on moving pictures photographed by a digital camera into still image data for printing on printing paper. Alternatively, the image processing apparatus 20 may be so configured as to convert moving picture data downloaded or distributed from a website or its equivalent medium through a communications line such as the Internet or moving picture data read out from an external device other than a digital camera into still image data for printing on printing paper. The same idea is applicable to a digital image processing method and a digital image processing program according to the embodiment of the invention.

(10) In the above embodiment, in displaying a still image frame on the monitor 241, the still image frame is displayed with image data amount reduction, whereas in printing the still image frame on printing paper, the still image frame is printed without image data amount reduction. Alternatively, a still image frame may be printed with image data amount reduction in the same manner as displayed on the monitor 241. Further alternatively, a still image frame may be printed by setting an image data amount reduction ratio (pixel number reduction ratio) with respect to each still image frame stored in the still image memory 222 smaller than that used in displaying the still image frame on the monitor 241.

(11) It should be appreciated that the inventive program can be distributed as a program product in a variety of forms, and that the invention applies equally regardless of the particular type of signal bearing media used to actually carry out the distribution. Examples of signal bearing media includes but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

As described above, an inventive digital image processing apparatus is provided with: a monitor which displays an image; a moving picture reading section which reads out moving picture data recorded on a recording medium; a storage section which stores still image data obtained from read moving picture data, the still image data having a number of still image frames; a display controller which displays on the monitor a specified number of still image frames of the still image data; an image designating section which allows an operator to designate a still image frame for print among the specified number of still image frames; and an image outputter which outputs still image data corresponding to the designated still image frame as print data. With this arrangement, the operator can easily designate a desired still image frame or frames to be printed while viewing still image frames on the monitor. Thus, the designation of still image frames from moving picture data can be performed user-friendly.

In the case that the moving picture data is recorded in a compression format on the recording medium, further, the apparatus may be further provided with an image converting section which converts read moving picture data into still image data having a number of still image frames, and the storage section stores converted still image data having a number of still image frames. In this arrangement, a still image frame or frames are displayed on the monitor by converting the moving picture data recorded in a compression format into still image data by the image converting section. Accordingly, the designation of a desired still image frame can be more easily performed even for compressed moving picture data.

The display controller may display a specified number of still image frames arranged in time series on the monitor at one time. Since the specified number of still image frames are displayed on the monitor in time series, the operator can easily designate a desired still image frame corresponding to an optimal scene to be printed or a still image frame corresponding to a scene in the vicinity of the optimal scene. The term "time series" throughout the description of the present specification may include a chronological direction and a direction opposite to the chronological direction.

The display controller may preferably display each still image frame in a state of the image data amount thereof being reduced. Since each still image frame is displayed on the monitor with its image data amount reduced, the image processing for display can be carried out in a shorter time.

The storage section may be provided with a first unit for storing a first type of converted still image data which has been processed with data reduction, the first type of converted still image data being used for display, and a second unit for storing a second type of converted still image data which has not been processed with data reduction, the second type of converted still image data being used for print. The image outputter outputs the second type of converted still image data corresponding to the designated still image frame to a printer. In this arrangement, a still image frame having a high resolution or without image data amount reduction can be printed on print paper while the corresponding still image frame is lightly displayed on the monitor with data reduction.

The digital image processing apparatus may be further provided with a storage controlling section which controls a specified number of still image frames so as to be stored in the memory while every a certain number of still image frames are removed based on the size of the moving picture data. With this arrangement, the storage capacity for still image data can be reduced because a certain number of still image frames are removed. The image processing can be expedited, and the user-friendly digital image printing system having high image processing performance can be produced.

The display controller may be preferably made to display a specified number of still image frames stored in the memory while a certain number of still image frames being removed. The specified number of still image frames are displayed in the state of a certain number of still image frames being removed. Accordingly, the display of still image frames can be performed in a shorter time and lightly.

The digital image processing apparatus may be further provided with a print mode designating section which provides the operator with selective designation of a first print mode of printing all the still image frames displayed on the monitor and a second print mode of printing a particular single still image frame among the still image frames displayed on the monitor. The image designating section includes an image searching portion for retrieving a particular still image frame among the still image frames when the second print mode is designated. With this arrangement, the operator can have an increased variety of printing formats owing to the two print modes, and further can search out a desired still image frame owing to the image searching portion. Specifically, when the first print mode is designated, all the still image frames displayed on the monitor are printed on print paper one by one, whereas when the second print mode is designated, a single still image frame in association with the group of still image frames is retrieved and printed on printing paper.

The image searching portion may be preferably provided with a plural enlargement displayer for displaying a set of a certain number of still image frames at an enlarged size, and an enlargement feeder for feeding still image frames for the plural enlargement display. In this arrangement, a series of still image frames including a designated still image frame are displayed on the monitor at an enlarged size than the first size at which the group of still image frames are initially displayed on the monitor. Accordingly, the operator can easily recognize a desired still image frames. Furthermore, the series of still image frames are displayed sequentially on the monitor, the operator can accurately identify and designate the still image frame he or she wants to print among a multitude of still image frames.

The image searching portion may be further provided with a single enlargement displayer for displaying a specified one of the certain number of still image frames on the plural enlargement display at a larger size than the size of the plural enlargement display, and a single enlargement feeder for feeding still image frames for the single enlargement display. In this arrangement, a single still image frame is displayed on the monitor at an enlarged size. The operator can furthermore easily identify and designate the still image frame he or she wants to print on the monitor.

Also, the single enlargement feeder may be made to feed frame by frame. The operator can select out a desired still image frame more accurately.

Further, the single enlargement feeder may be made to feed every a certain number of frames. With this arrangement, the operator can accurately identify and designate a still image frame corresponding to an optimal scene he or she wants to print or a still image frame corresponding to a scene in the vicinity of the optimal scene.

The display controller may be made to display on the monitor a single still image frame at one time. With this arrangement, the operator can accurately select a desired still image frame because a single still image frame is displaced at one time.

The image outputter may be provided with an output mode designating section which allows the operator to selectively designate a first output mode of printing a designated still image frame on print paper, and a second output mode of recording image data of a designated still image frame on an external recording medium; and a data writing section which records the designated still image frame for print on an external recording medium when the second output mode is designated. In this arrangement, the still image frame to be printed is recorded in the external recording medium for storage. The still image frame can be printed on printing paper after being temporarily stored in the external recording medium such as a personal computer. This arrangement provides a digital image processing apparatus of multi-purpose use.

An inventive method for processing digital image, comprises the steps of reading out moving picture data recorded on a recording medium; obtaining still image data from read moving picture data, the still image data having a number of still image frames; storing obtained still image data having a number of still image frames in a memory; displaying on a monitor a specified number of still image frames of the still image data; allowing an operator to designate a still image frame for print among the specified number of still image frames; and outputting still image data corresponding to the designated still image frame as print data. With this method, the operator can easily designate a desired still image frame to be printed by viewing the screen image on the monitor.

In the case of the moving picture data being recorded in a compression format on the recording medium, read moving picture data may be converted into still image data having a number of still image frames in the step of obtaining still image data. In the step of displaying still image frames, a specified number of still image frames arranged in time series may be displayed on the monitor at one time. With this method, the specified number of still image frames are displayed in time series on the monitor. Accordingly, the operator can easily designate a desired still image frame to be printed by viewing the screen image on the monitor.

In the step of displaying still image frames, a single still image frame may be displayed on the monitor at one time. With this method, the operator can designate a desired still image frame more accurately.

In the step of displaying still image frames, a single still image frame may be displayed on the monitor every a certain number of still image frames in a time ordered series. Accordingly, a desired still image frame can be designated more promptly because still image frames are checked every a certain number of frames.

In the step of storing still image data, two types of converted still image data may be stored in different memory units respectively, one type of converted still image having been processed with data reduction and being used for display, and the other type of converted still image data having not been processed with data reduction and being used for print. With this method, the display of still image frames can be performed in a shorter time while a desired still image frame can be printed at a high resolution.

Furthermore, an inventive program product comprises: a program configured to process digital image by the steps of reading out moving picture data recorded on a recording medium; obtaining still image data from read moving picture data, the still image data having a number of still image frames; storing obtained still image data having a number of still image frames in a memory; displaying on a monitor a specified number of still image frames of the still image data; allowing an operator to designate a still image frame among the specified number of still image frames; and outputting still image data corresponding to the designated still image frame as print data; and a signal bearing media bearing the program. The signal bearing media may include at least one of a transmission-type media and a recordable media. With this arrangement, the useful program can be easily distributed.

Moreover, an inventive digital image printing system comprises: a monitor which displays an image; a moving picture reading section which reads out moving picture data recorded on a recording medium; a storage section which stores still image data obtained from read moving picture data, the still image data having a number of still image frames; a display controller which displays on the monitor a specified number of still image frames of the still image data; an image designating section which allows an operator to designate a still image frame for print among the specified number of still image frames; an image outputter which outputs still image data corresponding to the designated still image frame as print data; and a printer which print the designated still image frame on print paper based the outputted print data. With this arrangement, the operator can easily designate a still image frame or frames to be printed while viewing still image frames on the monitor. Thus, the digital image printing system can ensure easier operation of designating and printing a desired still image frame.

This application is based on Japanese patent application No. 2001-351701 filed on Nov. 16, 2001, the contents of which are hereby incorporated by references.

As the invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A digital image processing apparatus comprising:
a monitor which displays an image;
a moving picture reading section reads out moving picture data recorded on a recording medium;
a first storage section which stores still image data obtained from reading moving picture data, the still image data having a number of still image frames;
a second storage section which stores still image data having a specified number of still image frames among the number of still image frames stored in said first storage section;
a display controller which displays on the monitor the specified number of sampled still image frames stored in said second storage section;
an image designating section which allows an operator to designate a sampled still image frame for print among the specified number stored in said second storage section; and
an image outputter which outputs still image data corresponding to the designated sampled still image frame as print data;
a print mode designating section which allows an operator to selectively designate a first print mode and a second print mode wherein when the first print mode is designated, said display controller displays all the still image frames stored in said second storage section on the monitor and when the second print mode is designated, a still image frame between the sampled still image frames displayed on the monitor is printed out by a control operation of the display controller;
an image searching section which retrieves the still image frame between the sampled still image frames displayed on the monitor by making reference to a designated still image frame among the sampled still image frames displayed on the monitor in response to designation on the second print mode;
a first feeder which controllably displays a series of the specific number of still image frames stored in said second storage section on the monitor;
a second feeder which controllably and sequentially displays the number of still image frames stored in said first storage section; and
wherein said image searching section retrieves the still image frame between the sampled still image frames from the still image frames stored in said first storage section except for the still image frames displayed on the monitor.

2. A digital image processing apparatus comprising:
a monitor which displays an image;
a moving picture reading section reads out moving picture data recorded on a recording medium;
a first storage section which stores the moving picture data in a moving picture file format;
a file format converting section which converts from the moving picture data in the moving picture file format to a still image data in a still image file format, the still image data having a number of still image frames;
a second storage section which stores a first type of still image data having the number of still image frames which has not been processed with an image data amount reduction;
a third storage section which stores a second type of still image data having a specified number of still image frames among the number of still image frames stored in said second storage section, the second type of still image data having been processed with an image data amount reduction;
a display controller which displays on the monitor the specified number of sampled still image frames stored in said third storage section;
an image designating section which allows an operator to designate a sampled still image frame for print among the specified number of still image frames stored in said third storage section; and
an image outputter which outputs still image data corresponding to the designated sampled still image frame as print data;
a print mode designating section which allows an operator to selectively designate a first print mode and a second print mode wherein when the first print mode is designated, said display controller displays all the still image frames stored in said third storage section on the monitor and when the second print mode is designated, a still image frame between the sampled still image frames displayed on the monitor is printed out by a control operation of the display controller;
an image searching section which retrieves the still image frame between the sampled still image frames displayed on the monitor by making reference to a designated still image frame among the sampled still image frames displayed on the monitor in response to designation on the second print mode;
a first feeder which controllably displays a series of the specific number of still image frames stored in said third storage section on the monitor;
a second feeder which controllably and sequentially displays the number of still image frames stored in said second storage section on the monitor; and
wherein said image searching section retrieves the still image frame between the sampled still image frames displayed on the monitor from the number of still image frames stored in said storage section except for the specific number of the sampled still image frames displayed on the monitor.

3. A digital image processing apparatus comprising:
a monitor which displays an image;
a moving picture reading section reads out moving picture data recorded on a recording medium;
a storage section which stores still image data obtained from reading moving picture data, the still image data having a number of still image frames;
an image display memory for temporarily storing a specified number of still image frames among said still image frames stored in the storage section;
a display controller which displays on the monitor said specified number of still image frames of the still image data;
an image designating section which allows an operator to designate a still image frame for print among the specified number of still image frames;

an enlargement displayer which displays the still image frames on the display at a first size, a second size, and a third size upon receipt of an input of the operator such that the third size is larger than the second size which is larger than the first size so that the operator can select the number of still image frames displayed on the screen by selecting the size of the still image frame to be displayed;

an image outputter which outputs still image data corresponding to the designated still image frame as print data;

a print mode designating section which allows an operator to selectively designate a first print mode and a second print mode wherein when the first print mode is designated, said display controller displays all the still image frames in the first size on the monitor, and when the second print mode is designated, one still image frame in either second or third size in association with the group of still image frames displayed on the monitor is printed out by a control operation of the display controller;

an image searching section which allows an operator to search and retrieve one still image frame from a block of still image frames stored in the storage section by making reference to a designated still image frame among a group of still image frames displayed on the monitor in response to designation on the second print mode, said image searching section including:

a first feeder for deeding the still image frames in said second size displayed on the monitor in backward or forward direction one by one among the data stored on the image display memory so as to allow the operator to search and select one still image frame which is close to or identical to the image the operator desires; and a second feeder for feeding the still image frame in said third size displayed on the monitor based on the selected one image flame by the operator with the use of the first feeder in backward or forward direction one flame to the other frame to the other frame among the data stored in the storage in the storage section;

whereby in the second print mode, when an image frame to be printed is a hidden still image frame, not found among the group of still image frames displayed on the monitor and the second feeder of said image searching section allows the operator to retrieve said hidden still image frame from a block of still image frames stored in the storage section by making reference to a designated still image frame among a group of still image frames displayed on the monitor wherein said hidden still image frame is one still image frame among the block of still image frames stored in the storage section except the still image frame group displayed on the monitor.

4. A digital image processing apparatus comprising:

a monitor which displays an image;

a moving picture reading section reads out moving picture data recorded on a recording medium;

a storage section which stores still image data obtained from reading moving picture data, the still image data having a number of still image frames;

a display controller which displays on the monitor a specified number of still image frames of the still image data;

an image designating section which allows an operator to designate a still image frame for print among the specified number of still image frames; and an image outputter which outputs still image data corresponding to the designated still image frame as print data;

a print mode designating section which allows an operator to selectively designate a first print mode and a second print mode wherein when the first print mode is designated, said display controller displays all the still image frames on the monitor and when the second print mode is designated, one still image frame in association with the group of still image frames displayed on the monitor is printed out by a control operation of the display controller;

an image searching section which retrieves one still image frame from a block of still image frames stored in the storage section by making reference to a designated still image frame among a group of still image frames displayed on the monitor in response to designation on the second print mode; whereby in the second print mode, when an image frame to be printed is a hidden still image frame, not found among the group of still image frames displayed onto monitor and said image searching section retrieves said hidden still image frame from a block of still image frames stored in the storage section by making reference to a designated still image frame among a group of still image frames displayed on the monitor wherein said hidden still image frame is one still image frame among the block of still image frames stored in the storage section except the still image frame group displayed on the monitor.

* * * * *